United States Patent [19]

Klever

[11] 3,891,725

[45] June 24, 1975

[54] VULCANIZABLE CHLORINATED ELASTOMER COMPOSITION

[75] Inventor: Harold Howard Klever, Munroe Falls, Ohio

[73] Assignee: E. I. du Pont de Nemours & Company, Wilmington, Del.

[22] Filed: Oct. 4, 1974

[21] Appl. No.: 512,045

[52] U.S. Cl. ........ 260/889; 260/28.5 A; 260/42.33; 260/80.78; 260/897 C
[51] Int. Cl. ...................... C08f 29/12; C08f 37/18
[58] Field of Search ........................ 260/897 C, 889

[56] References Cited
UNITED STATES PATENTS

| | | | |
|---|---|---|---|
| 3,296,183 | 1/1967 | Schoenbeck | 260/41 |
| 3,639,529 | 2/1972 | MacKenzie et al. | 260/897 C |
| 3,641,216 | 2/1972 | Schnebelen et al. | 260/897 |

*Primary Examiner*—Murray Tillman
*Assistant Examiner*—C. J. Seccuro

[57] ABSTRACT

A vulcanizable composition of the chlorinated elastomers chlorinated polyethylene, chlorosulfonated polyethylene or chloroprene polymers containing about 3–20 parts, based on 100 parts of chlorinated elastomer, of a sulfur-curable copolymer having ethylene units, propylene units, units derived from a monoreactive nonconjugated diene having only one polymerizable double bond, e.g., 1,4-hexadiene, and units derived from a $C_5$—$C_{22}$ direactive nonconjugated diene having two polymerizable double bonds, e.g., 1,7-octadiene. The present compositions in the uncured state have improved cohesive strength and when extruded the formed articles, e.g., tubing, resist deformation.

8 Claims, No Drawings

VULCANIZABLE CHLORINATED ELASTOMER COMPOSITION

BACKGROUND OF THE INVENTION

This invention relates to a vulcanizable composition of a chlorinated hydrocarbon elastomer and, more particularly, one in which the uncured shaped composition has improved cohesive strength and resists deformation.

Chlorinated hydrocarbon elastomers, such as chlorosulfonated polyethylene, are generally supplied to the fabricator in a solid form, usually as chips. However, in order for these polymers to possess properties required for commercial use, curing agents, fillers, pigments, and other additives are routinely incorporated into the polymer. Incorporation of such ingredients into the polymer requires highly energetic mixing of the ingredients with the polymer on a rubber mill or in an internal mixer such as a Banbury mixer. During the mixing operation considerable heat is generated which generally raises the temperature of the polymer mass to between about 100° to 125°C., causing it to become increasingly tacky and to lose cohesive strength. As a consequence, the hot polymer mass tends to stick to the mixing equipment and removal can be difficult without first cooling the equipment which is an inconvenient and expensive step.

More importantly, when the unvulcanized chlorinated hydrocarbon elastomers are formed into various intricate shapes for use as gaskets or tubing there is a tendency for the shaped article to deform or collapse prior to or during vulcanization when no support is provided for the shaped article. For example, when an unvulcanized tubing of chlorosulfonated polyethylene composition is passed in the preparation of hose through a knitting or braiding machine, which applies reinforcing fabric over the tubing, the forces exerted on the tubing during the operation tend to deform or distort it because of its lack of cohesive strength.

The problem of polymer adhering to the mill or calender rolls has been alleviated by the addition of various release agents such as waxes, paraffin, and low molecular weight polyethylene. However, the conventional release agents do not satisfactorily solve the problem of distortion of the unvulcanized compositions. Extraordinary and expensive techniques of providing support are required to adequately solve this serious problem involving distortion of shaped unvulcanized chlorinated hydrocarbon elastomers. Therefore, there is a need in the art for a vulcanizable composition that exhibits minimum deformation after it is formed and during curing and, at the same time, has improved cohesive strength and is easily removed from rubber processing equipment, such as rubber mills or calenders. The present invention fulfills such need.

SUMMARY OF THE INVENTION

It has now been discovered that chlorinated hydrocarbon elastomers containing a particular copolymer produce a vulcanizable composition that can be easily removed from rubber processing equipment and when formed into a particular shape retain that shape through vulcanization. More particularly, this invention is directed to a vulcanizable chlorinated hydrocarbon elastomer selected from the group consisting of chlorinated polyethylene, chlorosulfonated polyethylene, or chloroprene polymers, the improvement which comprises said chlorinated hydrocarbon elastomer containing from about 3–20 parts, based on 100 parts of chlorinated elastomer, of a copolymer having ethylene units, propylene units, units derived from a monoreactive nonconjugated diene having only one polymerizable double bond, and units derived from a $C_5$—$C_{22}$ direactive nonconjugated diene having two polymerizable double bonds. Preferably, the chlorinated hydrocarbon elastomer contains from about 5 to 10 parts, based on 100 parts of chlorinated elastomer, of the copolymer. Most preferably, the nonconjugated diene having two polymerizable double bonds is derived from norbornadiene and the nonconjugated diene having one polymerizable double bond is derived from 1,4-hexadiene.

The vulcanizable chlorinated hydrocarbon elastomer composition is made by intimately mixing the chlorinated polymer with the above defined copolymer on a rubber mill or in a Banbury mixer at temperatures of from about 100°–125°C. The composition is readily removed from the mixer and extruded by conventional techniques to form, for example, tubing used in making rubber hose. The uncured tubing when placed in cut lengths on trays retains its shape prior to and during vulcanization even when the tubing is stacked several layers deep according to conventional practice. Vulcanization is usually performed by placing the trays in an autoclave heated to about 150°–160°C. for about 20 to 40 minutes.

DETAILED DESCRIPTION OF THE INVENTION

The chlorinated hydrocarbon elastomer compositions that exhibit improved physical properties in relation to minimal distortion in the unvulcanized state and easy removal from rubber compounding equipment are prepared by intimately mixing solid chlorinated polyethylene, chlorosulfonated polyethylene or chloroprene polymers with from about 3–20 parts, based upon 100 parts of the chlorinated elastomer, of a copolymer having ethylene units, propylene units, units derived from a monoreactive nonconjugated diene having only one polymerizable double bond, and units derived from a $C_5$—$C_{22}$ direactive nonconjugated diene having two polymerizable double bonds until a viscous, or soft plastic, mass is obtained. Usually this requires mixing the composition in an internal mixer until the temperature increases to about 100° – 125°C. over a period of between about 1.5 and 4 minutes. The blended polymer composition is then in suitable condition for extrusion.

Any chlorinated or chlorosulfonated polyethylene, or chloroprene polymer can be treated according to the teaching of the present invention to gain the advantages mentioned above. Generally, the chlorinated polymer has a chlorine content of between about 20 and 50% by weight. The sulfur content of chlorosulfonated polyethylene is about 1 to 2.5% by weight. The chlorinated or chlorosulfonated polyethylene polymers, which are well known in the art, can be branched or linear and are made from polyethylene having a density of from about 0.9 to 0.97. Chlorosulfonated polyethylenes having a density of about 1.10 – 1.28 are available under the tradename "Hypalon" sold by E. I. du Pont de Nemours and Company. Polymers of chloroprene, i.e., neoprene, are made by polymerizing chloroprene, or a mixture of monomers, the major component of which is chloroprene.

The copolymer added as a modifying agent to the chlorinated hydrocarbon polymer contains from 25–75% by weight ethylene units, 0.01–0.5 gram-mole per kilogram of copolymer of units derived from a $C_5$–$C_{22}$ direactive non-conjugated diene having two polymerizable double bonds, units derived from a monoreactive nonconjugated diene having only one polymerizable double bond selected from the group consisting of an aliphatic diolefin and a cycloaliphatic compound having a 1- or 2-carbon bridged ring structure to provide 0.1 to 4.0 gram-moles of carbon-carbon double bonds per kilogram of copolymer, and the balance is propylene units.

The direactive nonconjugated diene can have terminal unhindered double bonds in the main chain structure of the monomer, and double bonds in strained ring cycloaliphatic structures. Suitable monomers can contain two terminal double bonds, two strained ring double bonds, or one of each. Representative monomers that are direactive include 1,4-pentadiene, 1,7-octadiene, 1,20-heneicosadiene, 5-(5-hexenyl)-2-norbornene, and 2,5-norbornadiene and the dimer thereof.

Monoreactive nonconjugated dienes having only one polymerizable double bond are present in an amount sufficient to provide 0.1–4.0 gram-moles per kilogram of carbon-carbon double bonds. The monoreactive dienes are aliphatic diolefins, and cycloaliphatic compounds having a 1- or 2-carbon bridged ring structure. Representative aliphatic nonconjugated dienes that are direactive include 1,4-hexadiene, 1,9-octadecadiene; representative cycloaliphatic compounds that are monoreactive include dicyclopentadiene, tricyclopentadiene, 5-ethylidene-2-norbornene, 5-methylene-2-norbornene, and alkenyl-substituted norbornenes having an internal double bond in the alkenyl group.

The copolymers used in this invention and disclosed above are described in detail in Campbell and Thurn U.S. Pat. No. 3,819,591, dated June 25, 1974.

The above-identified blend of chlorinated elastomers and sulfur-curable copolymer contain vulcanizing agents that are blended into the composition. Other conventional ingredients used in either sulfur curing systems or peroxide curing systems, such as inorganic or organic accelerators and activators or peroxides, together with conventional additives to improve properties of the cured product such as reinforcing fillers, pigments, antiozonants, and the like, can be incorporated in the composition during compounding.

For a clearer understanding of the invention the following specific examples are given. All amounts given are by weight unless otherwise indicated.

EXAMPLE 1

An elastomeric composition in which the chlorinated hydrocarbon elastomer is chlorinated polyethylene was prepared by mixing the following ingredients in a Banbury mixer:
- 100 parts of chips of chlorinated polyethylene (chlorine content of 35%)
- 10 parts of a sulfur-curable copolymer containing 68% ethylene, 28% propylene, 4% 1,4-hexadiene, 0.016 gram-mole per kilogram of copolymer norbornadiene, has an inherent viscosity of 1.8 measured in a solution of 0.1 g. in 100 ml. of tetrachloroethylene at 30°C.,
- 5 parts of magnesium oxide,
- 100 parts of soft clay,
- 20 parts of chlorinated paraffin wax (chlorine content 40%),
- 3 parts of triallylisocyanurate, and
- 6 parts of dicumyl peroxide on calcium carbonate (dicumyl peroxide content 40%).

The ingredients were mixed for about 2 minutes at which time the temperature of the mixture reached 115°C. The composition became soft and plastic, and was removed from the mixer with ease; it was highly cohesive and a minimal amount adhered to the rotors.

The composition was extruded in the shape of a tube in an extruder having a maximum outside diameter of 5.1 centimeters and an annular die opening with an inside diameter of about 1.59 centimeters and an outside diameter of about 2.06 centimeters. The tubing was cooled to ambient temperature and placed on a flat surface without support. The tubing was inspected after 24 hours and the inside diameter of the tubing was measured in both the vertical and horizontal direction to determine distortion or its degree of slump. The degree of slump was expressed as the ratio of the horizontal diameter to the vertical diameter of the tubing. This ratio, termed the "slump factor", has a value of 1.0 for tubing which completely resists slumping and approaches infinity when the tubing has no slump resistance. It was determined that the chlorinated polyethylene tubing containing the copolymer had a slump factor of 1.22, thus indicating excellent resistance to deformation by the force of gravity in an unsupported state. The uncured tubing was passed through a braiding machine to make hose and it was subsequently cured in a conventional manner. Examination indicated that it retained its shape through these operations.

EXAMPLE 2

An elastomeric composition in which the chlorinated hydrocarbon elastomer is chlorosulfonated polyethylene was prepared by mixing in a Banbury mixer:
- 100 parts of chips of chlorosulfonated polyethylene (chlorine content 35%, sulfur content 1%, Mooney viscosity 55),
- 5 parts of the sulfur-curable copolymer of 68% ethylene, 28% propylene, 4% 1,4-hexadiene, and 0.016 gram-mole per kilogram of copolymer norbornadiene,
- 9 parts of litharge,
- 5 parts of magnesium oxide,
- 100 parts of carbon black,
- 2 parts of nickel dibutyl dithiocarbamate,
- 1 part of dipentamethylenethiuram tetrasulfide,
- 1 part of N,N'-n-phenylenedimaleimide,
- 1 part of benzothiazyl disulfide, and
- 5 parts of polymeric ester plasticizer.

The ingredients were mixed for about 2 minutes at which time the temperature reached about 115°C. The composition became soft and plastic, and was removed from the mixer with ease; it showed good cohesive strength and did not adhere to the rotors.

The composition was extruded in the shape of a tube, as described in the procedure given in Example 1. The tubing was cooled to ambient temperature and placed on a flat surface without support. Examination of the tubing indicated that the slump factor was about equivalent to that of the tubing made in Example 1 above. The tubing was cured on a tray in an autoclave in a conventional manner at a temperature of about 150°C. for 30 minutes. Examination of the tubing indicated that it retained its shape.

Analysis of a sample of the unvulcanized composition after mixing showed it had a tensile modulus at 20% elongation at 38°C. that is 25% higher, and at 52°C. that is 85% higher than that of a similar composition which did not contain the sulfur-curable polymer, demonstrating the improved cohesive strength of the compositions of this invention and, as a consequence of the higher modulus, the composition has excellent slump resistance.

EXAMPLE 3

An elastomeric composition in which the chlorinated hydrocarbon elastomer is neoprene was prepared by mixing the following ingredients in a Banbury mixer:

100 parts of chips of neoprene,
10 parts sulfur-curable copolymer containing 68% ethylene, 28% propylene, 4% 1,4-hexadiene and 0.016 gram-mole per kilogram of copolymer norbornadiene,
2 parts of the reaction product of diphenylamine and diisobutylene,
4 parts of magnesium oxide,
5 parts of zinc oxide,
100 parts of hard clay,
15 parts of naphthenic process oil having an aniline point of 80°C.,
0.5 part of sulfur,
0.5 part of tetramethylthiuram monosulfide,
0.5 part of 2-mercaptoimidazoline, and
0.5 part of di-orthotolyl-guanidine.

The ingredients were mixed for about 3 minutes until the temperature reached 125°C. The composition became soft and plastic and was removed from the mixer with ease; it was cohesive and did not unduly adhere to the rotors.

The composition was extruded in the shape of a tube as described in Example 1. The tubing was cooled to ambient temperature and placed on a flat surface without support for 24 hours. The tubing showed excellent resistance to deformation and examination of the tubing indicated that the slump factor was about equivalent to that of the tubing of Example 1 above.

The tubing was cured on a tray in an autoclave in a conventional manner at a temperature of about 150°C. for 30 minutes. The tubing retained its shape.

A sample of the unvulcanized composition after mixing showed that it had a tensile modulus at 20% elongation at 38°C. that is 150% greater than that of a similar composition that does not contain the sulfur-curable copolymer, thus indicating the composition of the present invention is substantially more resistant to deformation or slump.

I claim:

1. In a vulcanizable composition of a chlorinated hydrocarbon elastomer selected from the group consisting of chlorinated polyethylene, chlorosulfonated polyethylene, or chloroprene polymers, the improvement which comprises said chlorinated hydrocarbon elastomer containing from about 3–20 parts, based on 100 parts of chlorinated elastomer, of a sulfur-curable copolymer having ethylene units, propylene units, units derived from a monoreactive non-conjugated diene having only one polymerizable double bond, and units derived from a $C_5$–$C_{22}$ direactive nonconjugated diene having two polymerizable double bonds.

2. The product of claim 1 wherein units derived from the direactive nonconjugated diene are present in an amount of about from 0.01–0.5 gram-moles per kilogram of the sulfur-curable copolymer.

3. The product of claim 2 wherein units derived from the monoreactive nonconjugated diene are present in an amount sufficient to provide about 0.1–4.0 gram-moles of carbon-carbon double bonds per kilogram of sulfur-curable copolymer.

4. The product of claim 3 containing 5 to 10 parts, based on 100 parts of chlorinated hydrocarbon elastomer, of said sulfur-curable copolymer.

5. The product of claim 4 wherein the units derived from the direactive nonconjugated diene are norbornadiene.

6. The product of claim 4 wherein the units derived from the monoreactive nonconjugated diene are 1,4-hexadiene.

7. The product of claim 4 wherein the chlorinated hydrocarbon elastomer is chlorosulfonated polyethylene.

8. The product of claim 4 wherein the chlorinated hydrocarbon elastomer is chlorinated polyethylene.

* * * * *